US008800476B2

(12) United States Patent
Dittmann et al.

(10) Patent No.: US 8,800,476 B2
(45) Date of Patent: Aug. 12, 2014

(54) VOLUME COMPENSATION FOR APPLICATION HEADS WITH APPLICATION WIDTH ADJUSTMENT

(75) Inventors: Ralf Dittmann, Melbeck (DE); Kai Luebbecke, Wittorf (DE); Jorg-Olaf Bagung, Deutsch Evern (DE); Jurgen Dittmers, Lueneburg (DE)

(73) Assignee: Nordson Corporation, Westlake, OH (US)

( * ) Notice: Subject to any disclaimer, the term of this patent is extended or adjusted under 35 U.S.C. 154(b) by 420 days.

(21) Appl. No.: 13/081,768

(22) Filed: Apr. 7, 2011

(65) Prior Publication Data
US 2011/0259265 A1  Oct. 27, 2011

(30) Foreign Application Priority Data

Apr. 13, 2010 (EP) .................... 10159732

(51) Int. Cl.
*B05B 7/00* (2006.01)
*B28B 13/00* (2006.01)

(52) U.S. Cl.
USPC ......................... 118/300; 425/380

(58) Field of Classification Search
None
See application file for complete search history.

(56) References Cited

U.S. PATENT DOCUMENTS

| 3,684,422 | A | * | 8/1972 | Huesing ............ 425/466 |
| 5,305,955 | A | * | 4/1994 | Smitherman et al. ........ 239/75 |
| 5,456,869 | A |   | 10/1995 | Miles et al. |
| 5,458,684 | A | * | 10/1995 | Miller et al. .......... 118/602 |
| 5,575,851 | A | * | 11/1996 | Abe et al. ............ 118/410 |
| 5,679,387 | A |   | 10/1997 | Cloeren et al. |

FOREIGN PATENT DOCUMENTS

| DE | 19536893 | A1 | 4/1997 |
| EP | 0595295 | A1 | 5/1994 |
| EP | 0891854 | A2 | 1/1999 |
| EP | 1987941 | A1 | 11/2008 |
| JP | 55028825 | A | 2/1980 |
| JP | 10005663 | A | 1/1998 |

OTHER PUBLICATIONS

Australian Patent Office, Examination Report No. 1 in Australian Application No. 2011201653, Dec. 10, 2012.
European Patent Office, European Search Report in EP Application No. 10159732.6, Jun. 11, 2010.

* cited by examiner

*Primary Examiner* — Dah-Wei D Yuan
*Assistant Examiner* — Charles Capozzi
(74) *Attorney, Agent, or Firm* — Wood, Herron & Evans, L.L.P.

(57) ABSTRACT

A device for dispensing fluid onto a substrate includes a basic body, a fluid supply channel connectible to a fluid source for supplying the fluid, and a nozzle assembly which has a distribution channel that communicates with the fluid supply channel and which has an essentially elongated slit that communicates with the distribution channel. The slit includes at least one discharge opening for dispensing the fluid. The effective length of the distribution channel is variable by means of a closure element that is movable in the distribution channel. An equalization channel is connected with the distribution channel, and the volume of the equalization channel is adjustable.

15 Claims, 10 Drawing Sheets

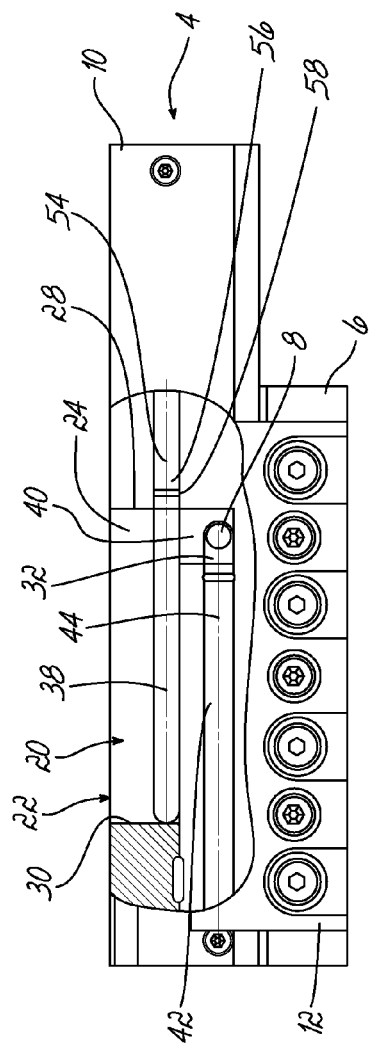
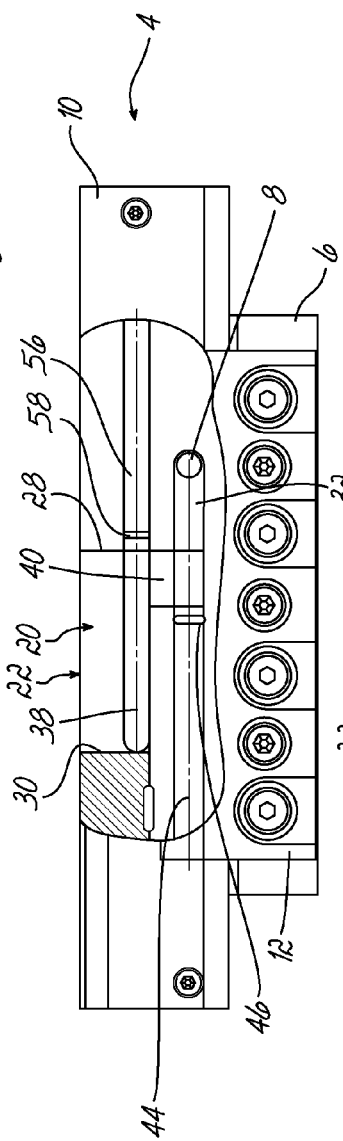
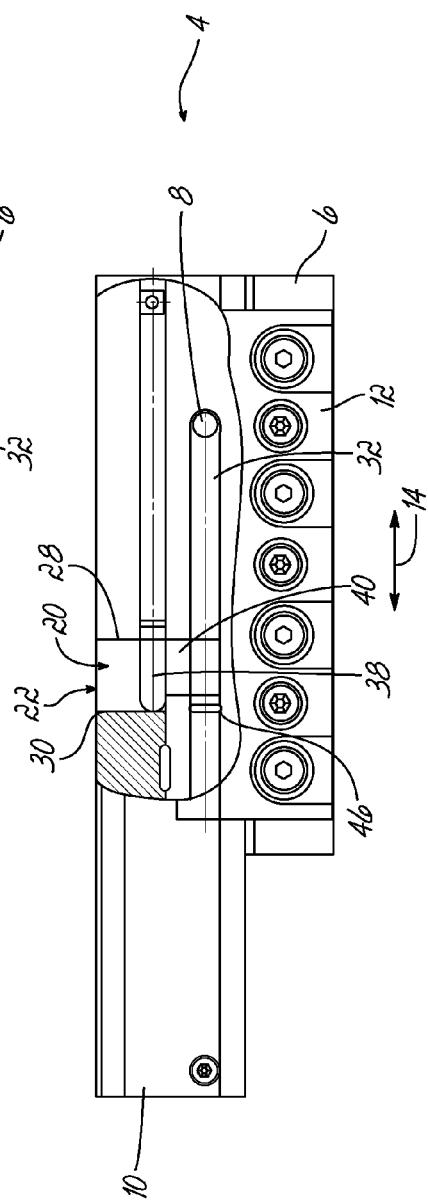

VOLUME COMPENSATION FOR APPLICATION HEADS WITH APPLICATION WIDTH ADJUSTMENT

TECHNICAL FIELD

The present invention generally relates to a device for dispensing fluid onto a substrate and more particularly, to a slit coating device having a variable length discharge slit.

BACKGROUND

Slit coating devices which are also referred to as application heads, are employed in various areas of industry to apply adhesives, sealants or other fluids to extensive areas of various substrates such as films, packaging materials, parts of machines or other work pieces. Such devices are also employed to apply glue to book spines. The device is mounted on a framework or the like, in such a way that the substrate which is to be coated is guided past while the fluid is being dispensed. The fluid flows out of the slit-shaped, elongated discharge openings onto the surface of the substrate. The discharge opening of the elongated slit of the slotted nozzle assembly may either be continuous, in order to apply a continuous strip of fluid, or may be subdivided to dispense and apply a plurality of adjacent strips or narrow strings or beads are dispensed and applied.

To vary the effective length of the essentially slit-shaped discharge opening of the nozzle assembly, the effective length of the transverse distribution channel that is fillable with fluid may be varied. To this end, a piston-like closure element is movably situated in the distribution channel on at least one side of the distribution channel. The closure element is sealed within the distribution channel, so that it delimits the distribution channel laterally in various positions in such a way that the effective length of the distribution channel, and thus the effective length of the slit, and hence of the slit-shaped discharge opening, is variable. The closure element may be connectible for example with a rod, which is movable back and forth manually or motor-driven or with the aid of a threaded spindle apparatus. In this way, it is possible for strips of fluid of differing widths to be dispensed and applied to a substrate. For example, when applying glue to book spines the application width is adjustable to the size of the books. Such a device is known for example from WO 00/67914. In some versions of the slotted nozzle assembly, the closure element is connected to an extension, sometimes referred to as a tab, that projects into the slit in the direction of the discharge opening so that the elongated slit is also limited laterally to the area of the discharge opening. The intent of this is to achieve sharp lateral limits to the strip of fluid being dispensed, and thus also of the strip being applied to the substrate.

When the length of the distribution channel is varied by shifting a closure element, the volume of the distribution channel changes. In those cases in which the closure element is connected to a which projects into the slit to the area of the discharge opening, the volumes of the distribution channel and of the slit. This change of volume can result in disadvantages when the length is varied. During a reduction of the application width by shortening the distribution channel, adhesive may be pressed out of the slit-shaped discharge opening, and this adhesive may discharge onto the substrate or the surroundings in an unwanted manner. When the volume of the distribution channel, and possibly of the slit, is increased, air may flow from the environment into the slit and the distribution channel while the volume of the distribution channel is increasing. When the application operation is resumed, the drawn in air may delay adhesive flow from the discharge opening, resulting in adequate coating of the substrate. This can result, for example, in a book spine being incompletely glued, so that it subsequently cannot be processed further.

The object of the present invention is therefore to provide a device for dispensing fluid onto a substrate, where the change in the effective length of the slit does not result in the disadvantages described above. In particular, a device for dispensing fluid is to be provided which immediately achieves optimal coating results, even after a change to the slit length and thus to the application width.

SUMMARY

The invention fulfills this object with a device for dispensing fluid onto a substrate utilizing an equalization channel with a fluid connection to the distribution channel. The volume of the equalization channel is changeable.

Because the equalization channel has a fluid connection to the distribution channel and a changeable internal volume, volume equalization or volume compensation can be realized. When the length of the distribution channel is shortened by movement of the closure element, the volume of the equalization channel increases. Conversely, when the distribution channel is enlarged by shifting the closure element in the opposite direction, the volume of the equalization channel decreases. When the closure element is shifted to vary the length of the distribution channel and thus the length of the slit, fluid is not forced out of the discharge opening and is not drawn into the slit and the distribution channel. The equalization channel allows compensation for internal volume changes of the distribution channel, and also of the slit. No product is wasted as a result of changing the length of the slit. Varying the slit length, and thus the application width, prevents both unwanted soiling of the external surfaces of the slotted nozzle assembly or the surroundings of the device, and poor coating results when the application process is turned on repeatedly.

In the preferred embodiment, the volume of the equalization channel is changeable depending on the size of the particular effective fluid-filled volume of the distribution channel such that when the effective length of the distribution channel is adjusted, the entire fluid-filled volume of the distribution channel, the equalization channel and the slit remains essentially constant. Therefore, the volumes of essential internal flow channels of the nozzle assembly remain essentially constant. Keeping the volume essentially constant ensures that air does not enter into the internal flow channels when the length is increased, and that there is no unwanted forcing or flowing of adhesive from the discharge opening when the length of the slit is reduced. To the degree the volume of the distribution channel and of the discharge opening changes, the volume of the discharge channel changes by the same amount. This results in the volume compensation according to the invention, and prevents the disadvantages present in the existing art.

In the preferred embodiment, the volume of the equalization channel is changeable due to a displacement element being movably situated within the equalization channel. This allows the described volume compensation to be accomplished.

In the preferred embodiment the displacement element is a piston, which is sealed and movably situated within the equalization channel. The piston may either be situated in the equalization channel using a metal seal, or may possibly also be sealed by at least one additional sealing element, such as a piston ring or the like. A piston of this sort can also be manufactured comparatively simply and precisely. Furthermore, such a piston can be temperature-resistant, particularly if it is made out of metal and the equalization channel is also formed within a metal component.

It is especially preferred that the equalization channel have an essentially cylindrical, partially cylindrical or essentially polygonal shape and be sealed by an essentially cylindrical, partially cylindrical or polygonal piston, respectively. This provides both functional and manufacturing related advantages. Furthermore, the desired volume compensation can be achieved precisely and pre-calculated exactly.

In an alternative preferred embodiment the movable closure element in the distribution channel is a piston which seals the distribution channel laterally, thereby limiting the effective length of the distribution channel. The advantages described above in connection with the displacement element of the equalization channel also result when the movable closure element within the distribution channel for varying the effective length is a piston.

In a preferred embodiment, the distribution channel and the equalization channel are situated essentially parallel to each other. The parallel arrangement of the distribution channel and the equalization channel results in additional advantages in terms of manufacturing technique. Furthermore, compact construction and a favorable flow of fluid can be realized.

The distribution channel and equalization channel communicate with each other by means of a connecting channel. In this embodiment the equalization channel is situated in relation to the supply channel and the equalization channel so that during operation, the fluid flows from the supply channel through the equalization channel, then through the connecting channel between equalization channel and distribution channel and then through the distribution channel and the slit. Because the fluid flows through all of the cavities on the way to the discharge opening, it is therefore possible to largely avoid dead spaces over the entire adjusting range of the application width for the fluid, in which the adhesive for example is not replaced. In this way, unwanted cracking or hardening of the fluid and air inclusions can largely be avoided.

In an alternative embodiment the device has two nozzle parts that are movable relative to each other in the longitudinal direction, and the slit is bounded laterally by the two nozzle parts. The effective length of the slit is changed by shifting the two nozzle parts relative to each other. This configuration allows for compact construction and reduces the number of moving parts.

According to another embodiment the distribution channel and/or equalization channel and/or connecting channel are formed essentially by a depression in one of the two nozzle parts, or by depressions in both nozzle parts. This design provides flow favorable paths and manufacturing advantages. For example, the channels can be produced as milled grooves in the nozzle parts.

In another embodiment, the piston for limiting the piston channel and/or the piston for changing the volume of the equalization channel are coupled mechanically with the movable nozzle part by a coupling rod. Coupling the piston in the distribution channel and/or the piston in the equalization channel with the movable nozzle part allows for simple automatic volume compensation. When the nozzle part is moved to change the length of the slit, the volume of the equalization channel adjusts automatically by repositioning a coupling or piston rod. For example, if the movable part of the nozzle is moved to reduce the slit length, the volume of the equalization channel can be enlarged by repositioning the piston appropriately. The two nozzle parts can be moved relative to each other by means of a mechanical or motor-driven apparatus, for example a threaded spindle, or else with the aid of an electric motor.

According to other alternative embodiments, the piston for changing the volume of the equalization channel has at least one through bore through which the fluid can flow. If a through bore is present in the piston, the fluid can be introduced from the supply channel through one or more through bores in the piston into the equalization channel in a simple manner. The piston is designed as a tube, which has an outside diameter such that the tube is situated movably within the correspondingly shaped equalization channel essentially with a metal seal. This allows the fluid to flow simultaneously through the interior of the tube from the supply channel into the equalization channel, flowing from there further into the distribution channel, through a connecting channel.

The tubular piston, which forms the displacement element in the equalization channel, allows for easy manufacture and enables fluid to be supplied effectively.

In an alternative embodiment, the piston has a plurality of through channels, through which fluid can flow from the equalization channel into the distribution channel. In this embodiment the piston is movable within the equalization channel, with its outside sealed. The one side of the equalization channel has a fluid connection to the supply channel. When the piston is shifted, the volume of the equalization channel simultaneously increases and the volume and length of the distribution channel decreases. The equalization channel and distribution channel are situated coaxially and adjacent to each other. The piston separates the equalization channel and the distribution channel from each other, and by repositioning the piston it varies the volume of the equalization channel and of the distribution channel simultaneously.

In an alternative embodiment, the piston has a first section in the form of a tube, through which fluid can flow from the fluid supply channel, and a sealing section, situated and sealed in the equalization channel, which bounds the tube at one end. Further, the tube has a plurality of through bores through which fluid can flow out of the tube into the equalization channel, and from there through the connecting channel into the distribution channel.

BRIEF DESCRIPTION OF THE DRAWINGS

The invention is described below on the basis of a plurality of preferred exemplary embodiments, with reference to the accompanying drawing. The figures show the following:

FIG. 6a is a partial sectional view of the device from FIG. 1, in a setting state with a large slit length.

FIG. 6b is a partial sectional view of the device from FIG. 1, in a setting state with a medium slit length.

FIG. 6c is a partial sectional view of the device from FIG. 1, in a setting state with a small slit length.

DETAILED DESCRIPTION

The exemplary embodiments depicted in the figures relate to devices 1 for dispensing fluid onto a substrate, in particular onto a substrate that is movable relative to the device. Various fluids may be dispensed, such as adhesives or hot melt adhesives, and may be applied to various substrates, such as books, book spines, films or the like. In particular, the devices are used for large-area coating of various substrates with adhesive. Of course, other fluids can be applied to other substrates over large areas or in strip form or in narrow strings.

Figure 1:
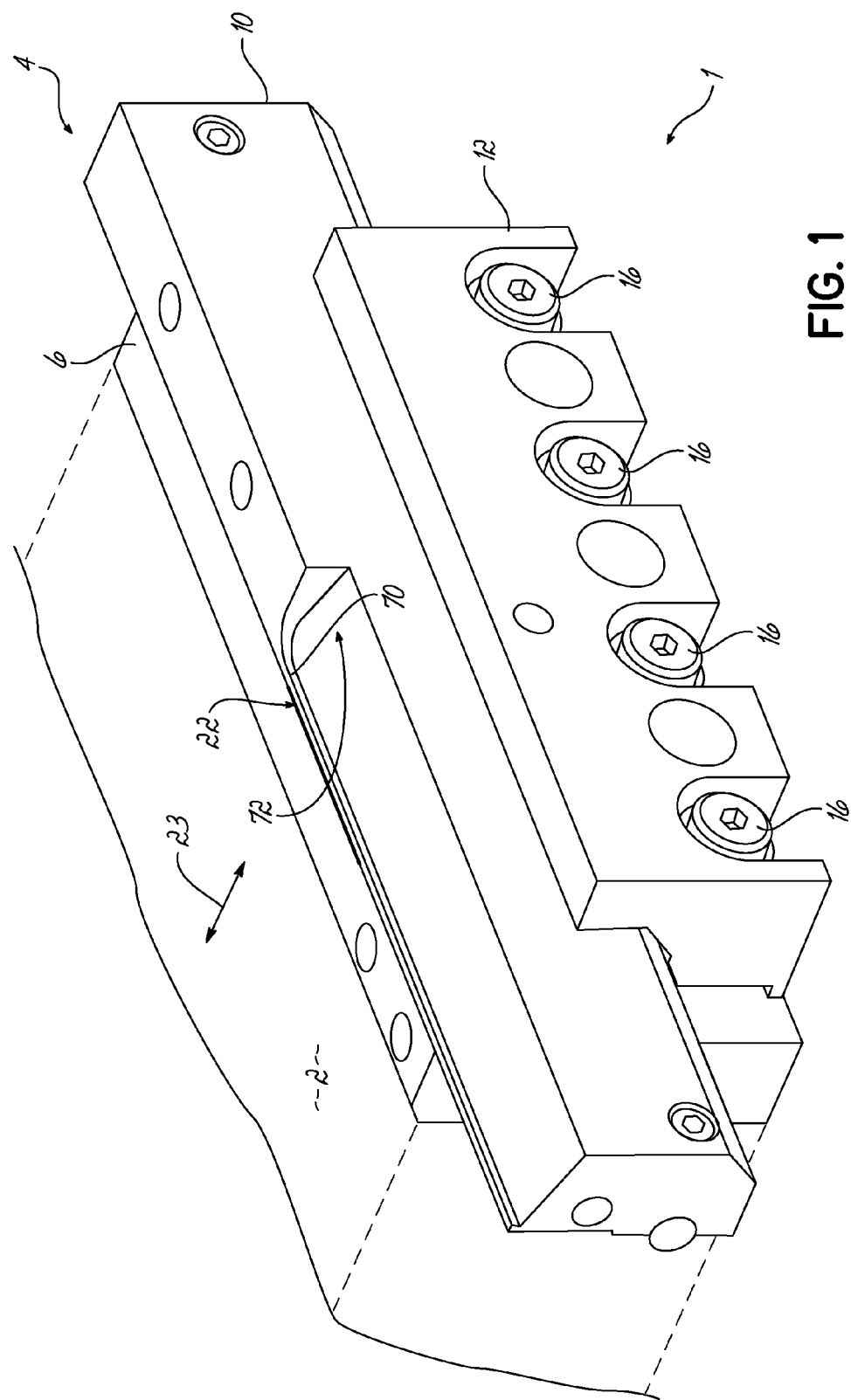
FIG. 1 is a perspective view of a device for dispensing fluid onto a substrate in a first exemplary embodiment.

As shown in particular in FIG. 1, device 1 has a basic body 2 which is indicated merely schematically. By means of basic body 2, device 1 may be positioned on a frame (not shown) in a desired installation position, so that a substrate such as for example a book may be transported past device 1 in such a way that dispensed fluid is applied to the substrate. A valve system for releasing or interrupting supplied fluid, control devices, heating devices, pneumatic connections and ducts in the case of pneumatic valves, or electrical connections and holding devices in the case of an electrical valve driving system, may be provided on basic body 2 in a known manner. A fluid supply channel may also be formed in basic body 2, to supply fluid.

Device 1 also has a nozzle assembly 4, removably attached to basic body 2. Nozzle assembly 4 has a first nozzle part 6, firmly screwed to basic body 2. The functions of basic body 2 and of nozzle part 6 may also be combined into one part. As shown by the rear view according to FIG. 5, nozzle part 6 has a fluid supply channel 8 that is formed in basic body 2, which communicates with a fluid source (not shown). The fluid can be introduced into nozzle assembly 4 through a fluid supply channel 8. It is designed as a through bore, and is likewise recognizable in the partial sectional view according to FIG. 6.

Nozzle assembly 4 also has another nozzle part 10, movable relative to first nozzle part 6, which is attached by means of a clamping piece 12 to stationary nozzle part 6 in such a way that it is movable back and forth in the direction of an arrow 14 (FIG. 2) and furthermore does not get lost, independent of the particular installation position of device 1. As FIG. 1 shows, clamping piece 12 is attached to nozzle piece 6 with a plurality of screws 16. Clamping piece 12 has an essentially rectangular form in cross section, and is provided in the area of a corner with a cutout 16 (FIG. 3), which is bounded by a plurality of flat surfaces. On a surface formed on a projection 18, clamping piece 12 is in contact with movable nozzle part 10.

Figure 2:
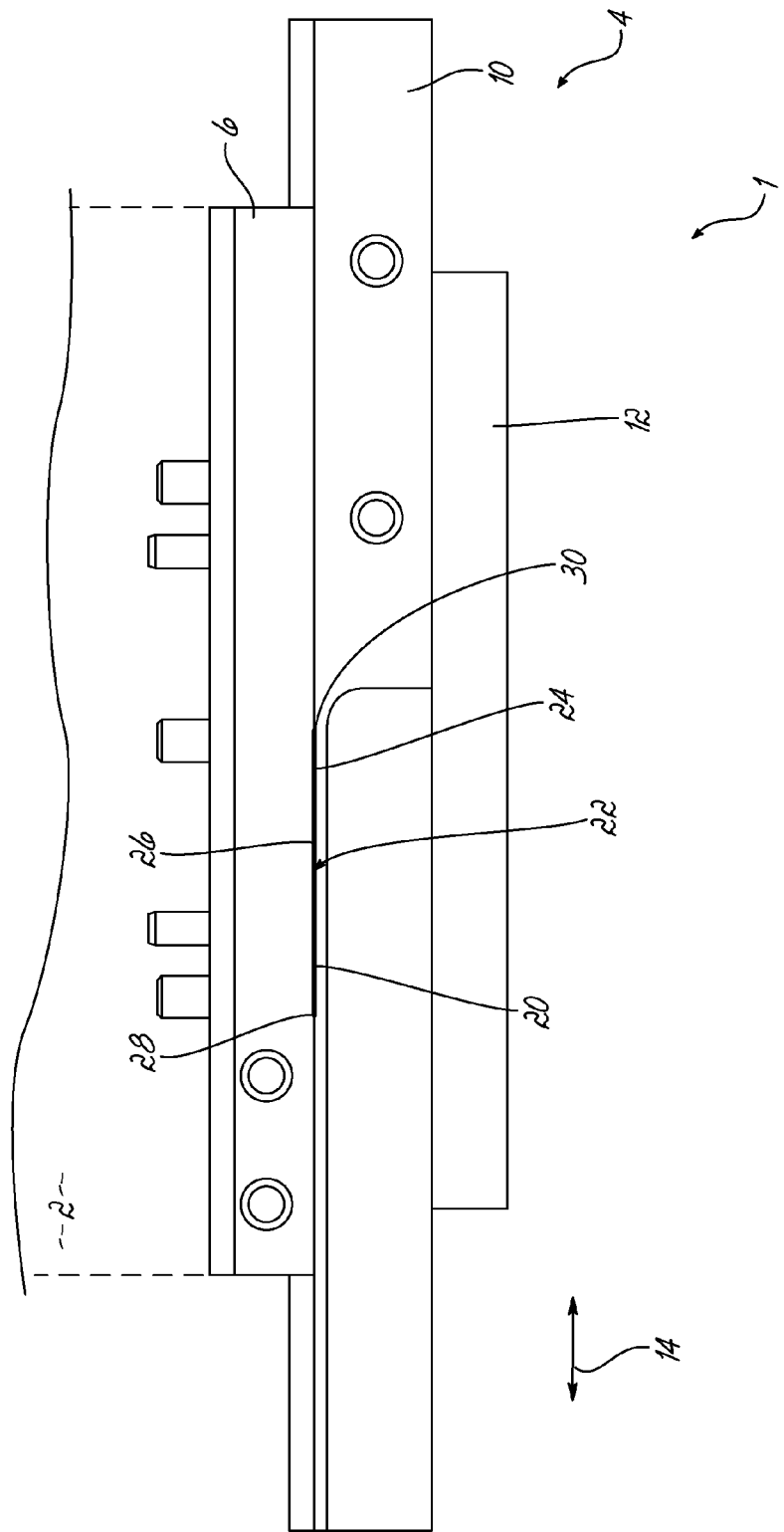
FIG. 2 is a top view of the device from FIG. 1.

Nozzle assembly 4 has a slit 20 (FIG. 2) that can be supplied with fluid, with a discharge opening 22 for dispensing fluid. The length of slit 20 which is an, extension in the direction of double arrow 14, is changeable. FIG. 1 shows the direction of motion of a substrate relative to device 1 (as indicated by double arrow 23), and in particular to discharge opening 22 of slit 20. Discharge opening 22 and the direction of motion of the substrate (double arrow 23) are essentially perpendicular to each other in the exemplary embodiment. The width of the slit is defined by the distance between nozzle part 6 and movable nozzle part 10 in the area of slit 20. In the exemplary embodiment, slit 20 is formed by nozzle parts 6, 10 by the fact that appropriately shaped depressions 24, 26, in particular milled cutouts, are formed in the opposing surfaces of nozzle parts 6, 10. Depression 24 in movable nozzle part 10 and slit 20 are both recognizable in the depictions in FIGS. 6a, b, c. A depression 26 is also formed on stationary nozzle part 6, as seen in FIG. 2. Slit 20 is bounded laterally by the lateral boundaries of depressions 24, 26, depicted in FIG. 2 by reference labels 28, 30, which are also shown in FIG. 6. The length of slit L and the length of discharge opening 22 is defined by the distance between lateral boundaries 28, 30 in the direction of longitudinal extension of slit 20, and thus also in the direction of double arrow 14.

The length or slit L can be varied by shifting movable nozzle part 10 relative to stationary nozzle part 6, as illustrated in FIGS. 6a through c. A spindle device having a threaded spindle, which is not shown in greater detail, provides the movement of nozzle piece 10. Nozzle piece 10 is movable axially back and forth in the direction of double arrow 14 by turning the threaded spindle. The threaded spindle is rotatably supported in a hole on a section of basic body 2 and has internal threading 13 situated on nozzle part 10, which is engaged by the external threading of the threaded spindle. Hence, by rotating the threaded spindle nozzle piece 10 can be moved to various positions axially in the direction of double arrow 14, examples of which are shown in FIGS. 6a through c, in order to be able to vary the length of slit 20 continuously.

Equalization channel 32 is formed within nozzle assembly 4. As may be seen clearly in FIG. 6, supply channel 8 communicates with an equalization channel 32, so that fluid may be introduced from supply channel 8 into equalization channel 32. Equalization channel 32 is essentially cylindrically shaped in the exemplary embodiment, the essentially cylindrical shape formed by a depression 34 with an essentially semicircular cross section being milled into fixed nozzle part 6 and a depression 36 likewise with an essentially semicircular cross section being formed in movable nozzle part 10. Alternatively, the equalization channel 32 is partially cylindrical.

Figure 4:
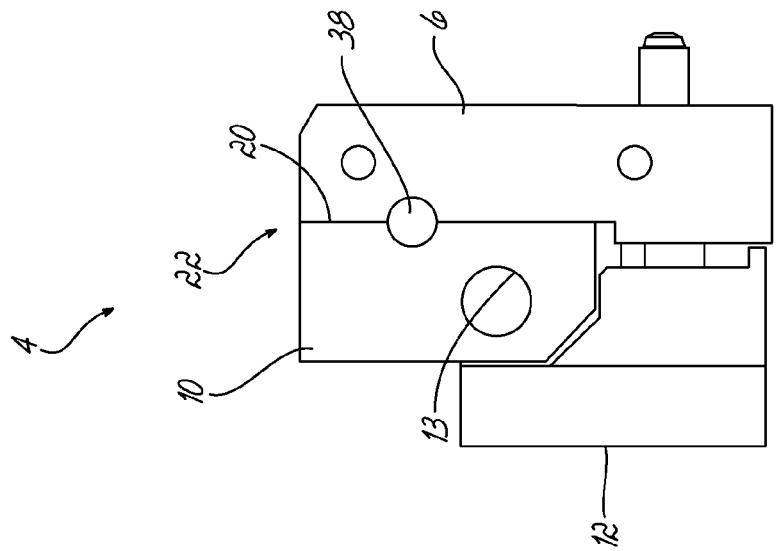
FIG. 4 is a right side view of the device from FIG. 1.

As seen in FIGS. 4 and 6, nozzle assembly 4 includes a transverse distribution channel 38, which is formed as a partially circular channel and extends in the direction of double arrow 14, and thus in the direction of the longitudinal extension of slit 20. Distribution channel 38 communicates with slit 20, so that fluid can issue uniformly from discharge opening 22 of slit 20. Distribution channel 38 has a fluid connection with equalization channel 32, and thus with supply channel 8 and the fluid source. Connecting channel 40 provides the fluid connection between distribution channel 38 and equalization channel 32. Connecting channel 40 is designed in the form of a depression in movable nozzle part 10. However, it could alternatively be designed as a depression in the stationary part, or in stationary part 6 and in movable nozzle part 10.

The volume for receiving fluid in equalization channel 32 is changeable due to a displacement element 42 in the form of a piston 44 being movably situated within equalization channel 32. A seal may be provided in the area of the end section of piston 44, designed for example as an O-ring seal 46 (FIG. 6). The effective volume of equalization channel 32 fillable with fluid from supply channel 8 is changed by moving displacement element 42 in the form of piston 44. If piston 44 in FIG. 6 moves to the left, the volume of equalization channel 32 fillable with fluid increases. If piston 44 moves to the right, the volume of equalization channel 32 fillable with fluid decreases.

Figure 5:
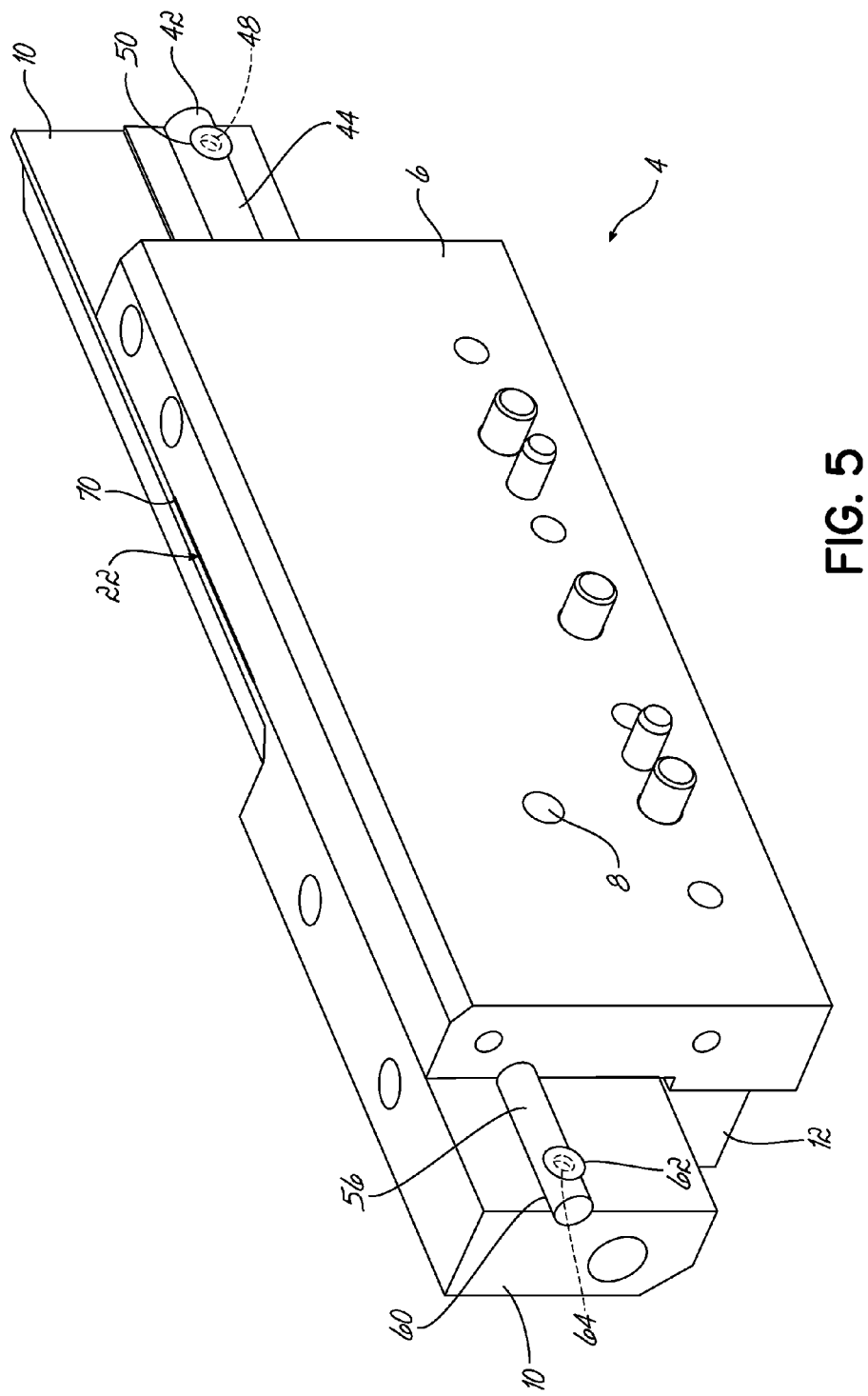
FIG. 5 is a rear perspective view of the device from FIG. 1.

Displacement element 42 in the form of piston as seen in FIG. 5, is coupled at its end section by a screw 48 that is inserted through a hole 50 and into a threaded hole which is formed in movable nozzle part 10 to receive screw 48. The result of coupling displacement element 42 with movable nozzle part 10 that is whenever nozzle part 10 is moved displacement element 42 is moved within equalization channel 32, causing the volume of the latter for receiving the fluid to change.

Within distribution channel 38 is a closure element 54 in the form of a piston 56, having a sealing element in the form of an O-ring 58 disposed on the end section of the piston 56 so that piston 56 is sealed within transverse distribution channel 38. Due to the movable, sealed arrangement, the effective length of distribution channel 38 fillable with fluid and the effective length of slit 20 are simultaneously changeable. As previously stated different lengths are already depicted in FIGS. 6a through c.

As illustrated in FIG. 5, end section 60 of piston 56 (see FIG. 5 left), is coupled with movable nozzle part 10. To this end, a screw 62 with its external threading is inserted through a through bore 64 in piston 56, and screwed into internal threading which is formed in movable nozzle part 10. Therefore, whenever movable nozzle part 10 moves, the effective length of distribution channel 38 fillable with fluid changes.

Whenever movable nozzle part 10 is moved to vary the length of slit 20, the effective length and the volume of distribution channel 38 change, and the effective length fillable with fluid also changes. Due to the dimensioning of distribution channel 38, equalization channel 32 and slit 20, when the length of distribution channel 38 is changed by moving movable nozzle part 10, the total volume of distribution channel 38, slit 20 and equalization channel 32 remains essentially constant. Because the volume remains essentially constant when nozzle part 10 is shifted, neither fluid is pressed out of discharge opening 22 nor does air penetrate into slit 20. This depends on whether the effective length of distribution channel 38 and thus the length of slit 20 is increased or decreased.

In a manner not shown, the shape of equalization channel 32 and/or the shape of distribution channel 38 may also be non-semicircular. For example, the shape may be multi-sided such as rectangular, square, polygonal, elliptical, circular or the like. Depending on the shape of equalization channel 32 and/or the shape of distribution channel 38, the shape of displacement element 42 of piston 44 and the shape of closure element 54 and of piston 56 would be matched, respectively.

Equalization channel 32 and distribution channel 38 in the exemplary embodiment are arranged essentially parallel to each other. Alternatively, equalization channel 32 and distribution channel 38 could be arranged in a non-parallel.

During operation, the fluid will flow through device 1 as follows. Fluid is introduced into nozzle assembly 4 through a supply channel 8 and flows into equalization channel 32. From equalization channel 32, the fluid flows through connecting channel 40 (FIG. 6). The fluid passes from connecting channel 40 into transverse distribution channel 38 and flows from the latter through slit 20, and dispenses through discharge opening 22 from device 1 and is applied to a substrate.

As illustrated in FIG. 6, the flow-traversed and effective lengths of both equalization channel 32 and transverse distribution channel 38 are changeable. The effective length is determined by the position of closure element 54 in distribution channel 38, or by the position of displacement element 42 in equalization channel 32. In FIG. 6a, the length of equalization channel 32 is relatively small, and the length of distribution channel 38 and the length of slit 20 are large. FIG. 6b depicts medium lengths of equalization channel 32 and distribution channel 38. In FIG. 6c, the length of equalization channel 32 is relatively large, and the length of distribution channel 38 and the length of slit 20 are relatively small. This results from the particular position of movable nozzle part 10.

Figure 3:
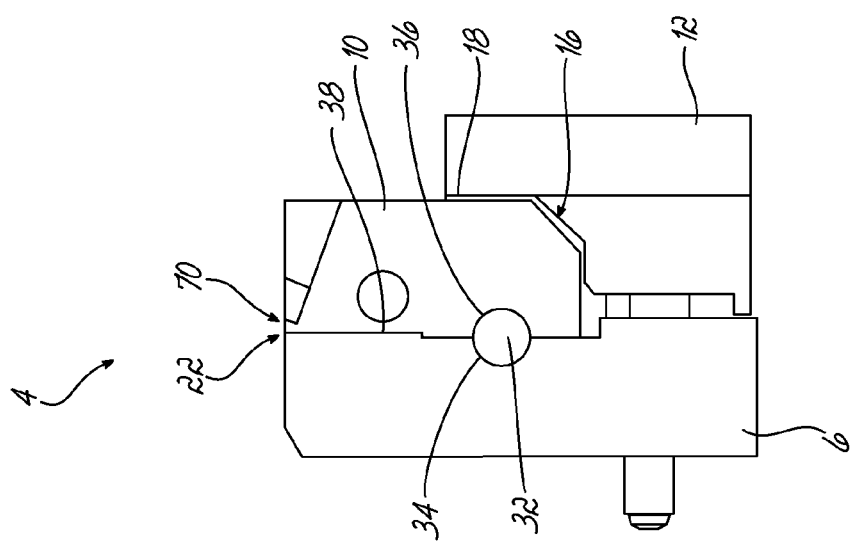
FIG. 3 is a left side view of the device from FIG. 1.

As shown in FIGS. 1 and 3, nozzle assembly 4 has a tear-off edge 70 which is formed by a recess 72 on movable nozzle part 10. At tear-off edge 70, the substrate coated with fluid, which is moving from left to right in FIG. 3, loses contact with the surface of the nozzle assembly, in particular of nozzle part 10. The fluid peels off well as a result, and remains on the substrate.

Instead of the mechanical coupling of pistons 44, 56, alternative coupling means may be provided. For example, motor-driven drive devices may be provided, in order to control pistons 44 and 56 with the aid of a control device in such a way that the sum of the volumes of distribution channel 38, slit 20 and equalization channel 32 remains essentially constant when the length of slit 20 is varied.

The equalization channel acts as a volume compensation system. When the effective length of the discharge opening 22 of slit 20 is changed by means of an equalization volume or an equalization channel 32, the entire volume of slit 20, of a transverse distribution channel 38 that communicates with it, and of an equalization channel 32 that communicates with distribution channel 38 and/or slit 20 can be kept essentially constant when the length of the slit 20 is varied. Embodiments has an equalization volume or an equalization channel 32, whose volume fillable with fluid is changeable and which communicates with distribution channel 38.

Figure 7:
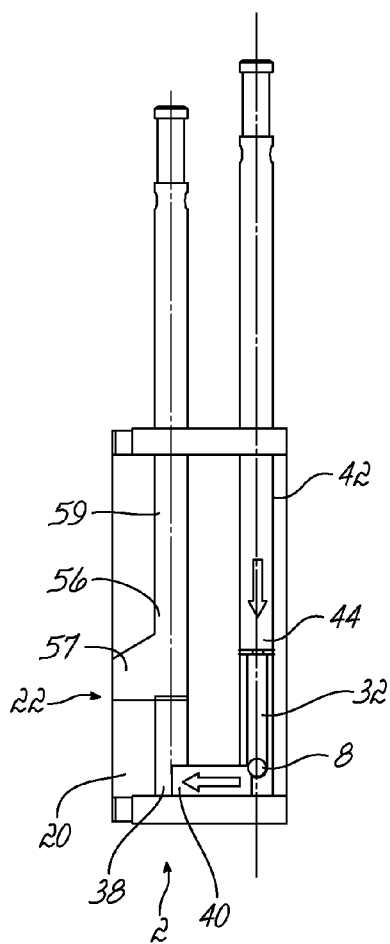
FIG. 7 is a schematic view of an alternative embodiment of a device for dispensing fluid.
Figure 8:
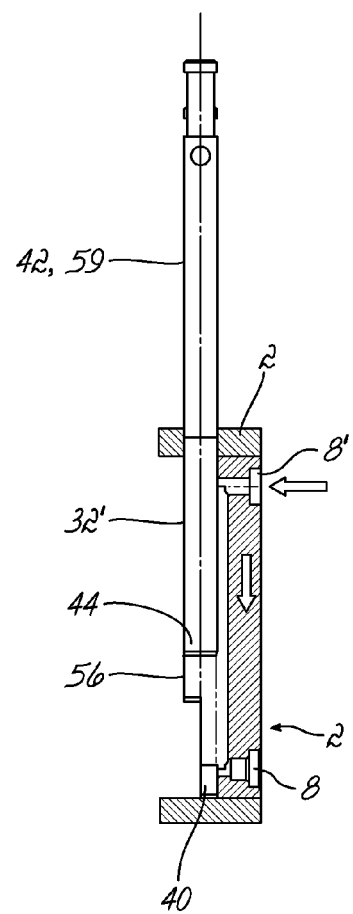
FIG. 8 is a partial sectional view of the device from FIG. 7.

The alternative exemplary embodiment of a device 1 for dispensing fluid shown in FIGS. 7 and 8 has components and functionalities similar to those of the exemplary embodiment previously described; to that extent the same reference labels have been used, and the above descriptions are referenced in their entirety. In the section below, essentially differences of the alternative exemplary embodiments are described.

In a basic body 2, a supply channel 8 is formed which communicates with a source of fluid. Fluid supply channel 8 communicates with an equalization channel 32 and with a connecting channel 40, each formed in the basic body 2. Connecting channel 40 has a fluid connection with a transverse distribution channel 38. Distribution channel 38 communicates with a slit 20, which has a slit-shaped discharge opening 22 through which fluid can be dispensed.

The effective length of distribution channel 38 and of slit 20 fillable with fluid can be varied by a piston 59 that is movably situated in the direction of its longitudinal axis and is sealed, forming a closure element. On the end of piston 59 a tab 57 is formed, which bounds slit 20 laterally. Piston 59 can be moved back and forth in order to vary the length of slit 20.

The volume of equalization channel can also be changed. To this end, a displacement element 42 in the form of a piston 44 is movably situated and sealed within distribution channel 38. To this end, piston 44 can be moved back and forth in the direction of arrow 14 along its longitudinal axis.

Alternatively, the device shown in FIGS. 7 and 8 may be configured so that a fluid supply channel 8' is formed in basic body 2, which flows through an annular space 32', forming an equalization channel 32' whose volume is changeable. To change the volume, a displacement element 42 in the form of a piston 44 is movably situated within equalization channel 32'. Ring-shaped equalization channel 32' communicates with a connecting channel 40, which has a fluid connection to a distribution channel 38, as described above.

Figures 9, 10:
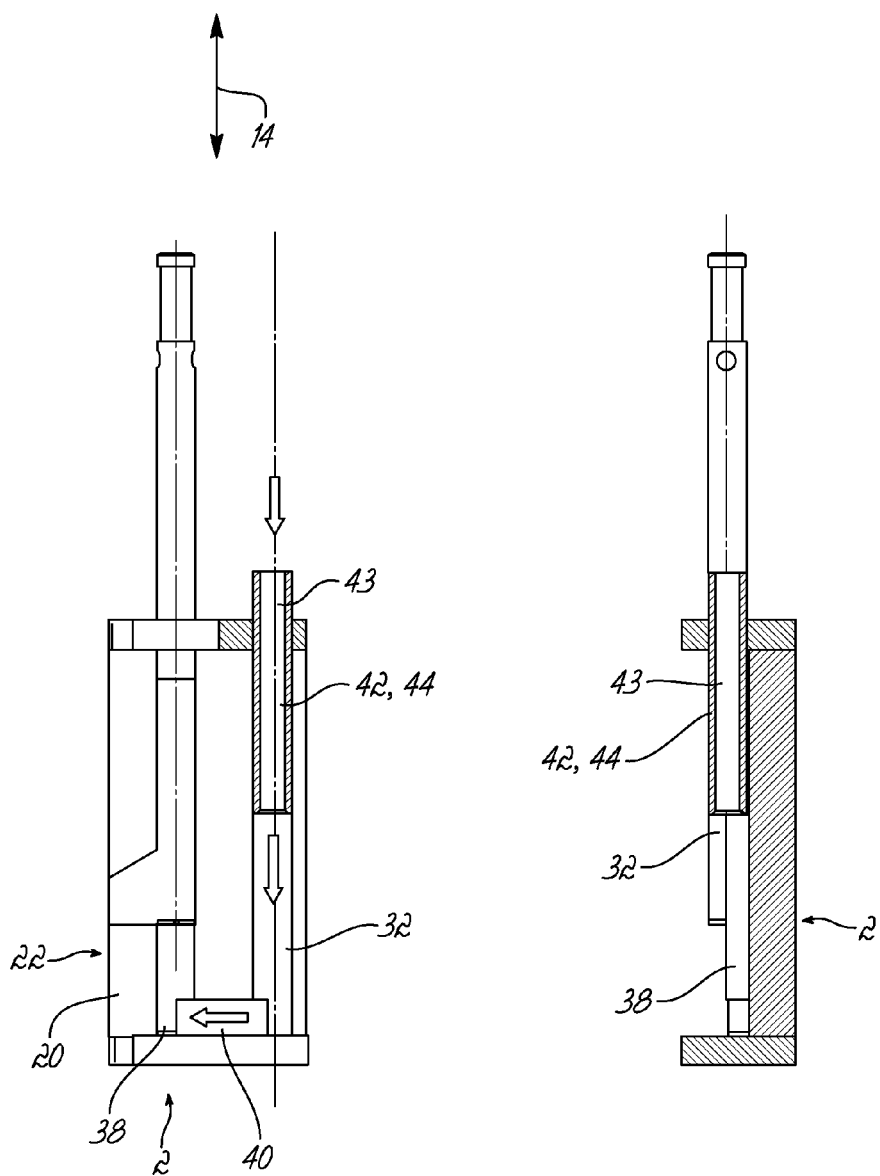
FIG. 9 is a schematic view of a device for dispensing fluid in another exemplary embodiment.
FIG. 10 is a partial sectional view of the device from FIG. 9.

In the alternative exemplary embodiment shown in FIGS. 9 and 10, one difference from the previously described exemplary embodiment consists essentially in the fact that in an equalization channel 32 formed in a basic body 2, a displacement element 42 or piston 44 formed as a tube is movably situated in the direction of double arrow 14, so that the volume of equalization channel 32 can be varied. The fluid source supplies the fluid through the internal cavity 43 of tube-shaped piston 44, whose upper end may be connected for example to a hose. The fluid can flow down further through equalization channel 32 in FIG. 10 and through a connecting channel 40, and then into transverse distribution channel 38, which communicates with slit 20. The effective length of distribution channel 38 in turn is changeable, as described earlier in the exemplary embodiment according to FIG. 7, in order to vary the length of slit 20.

Figure 11:
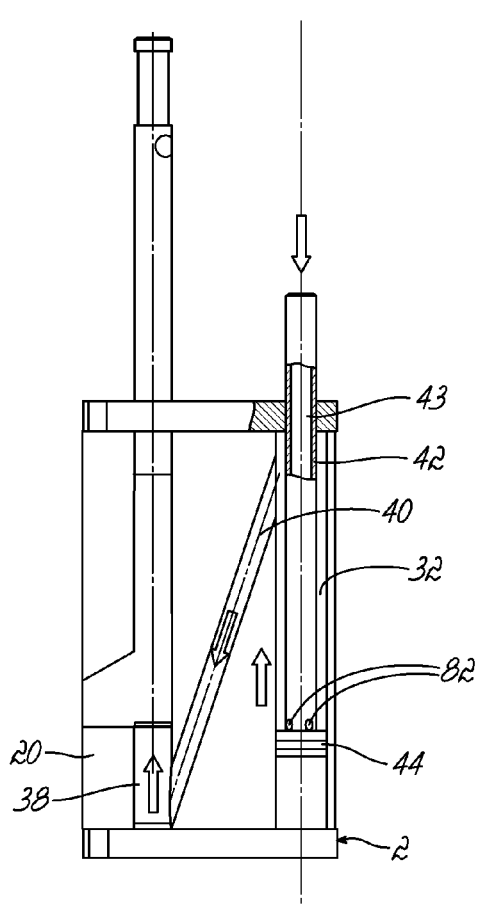
FIG. 11 is a schematic view of an alternative embodiment of a device for dispensing fluid.
Figure 12:
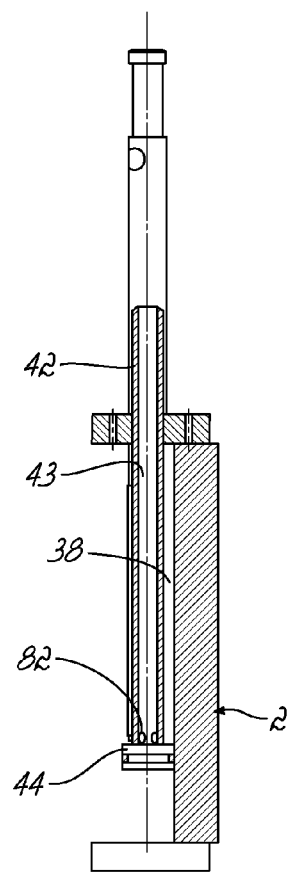
FIG. 12 is a partial sectional view of the device from FIG. 11.

Reference is also made in full to the above descriptions with regard to the alternative exemplary embodiment shown in FIGS. 11 and 12. Device 1 for dispensing fluid also has a basic body 2. Fluid can be introduced from a supply channel 8 through an equalization channel 32, which is formed in basic body 2 as a ring channel. Again, a tube-shaped displacement element is movably situated within equalization channel 32. At the lower end of tube-shaped displacement element 42 is a sealed piston 44, which closes the internal cavity 43 of the tube. Furthermore, a plurality of through channels 82 distributed around the circumference are formed in tube-shaped displacement element 42, through which fluid can flow from the internal cavity 43 into equalization channel 32. The fluid can flow further through a connecting channel 40 whose upper section communicates with equalization channel 32, from equalization channel 32 into transverse distribution channel 38, and from there into slit 20 in the manner previously described.

Figures 13, 14:
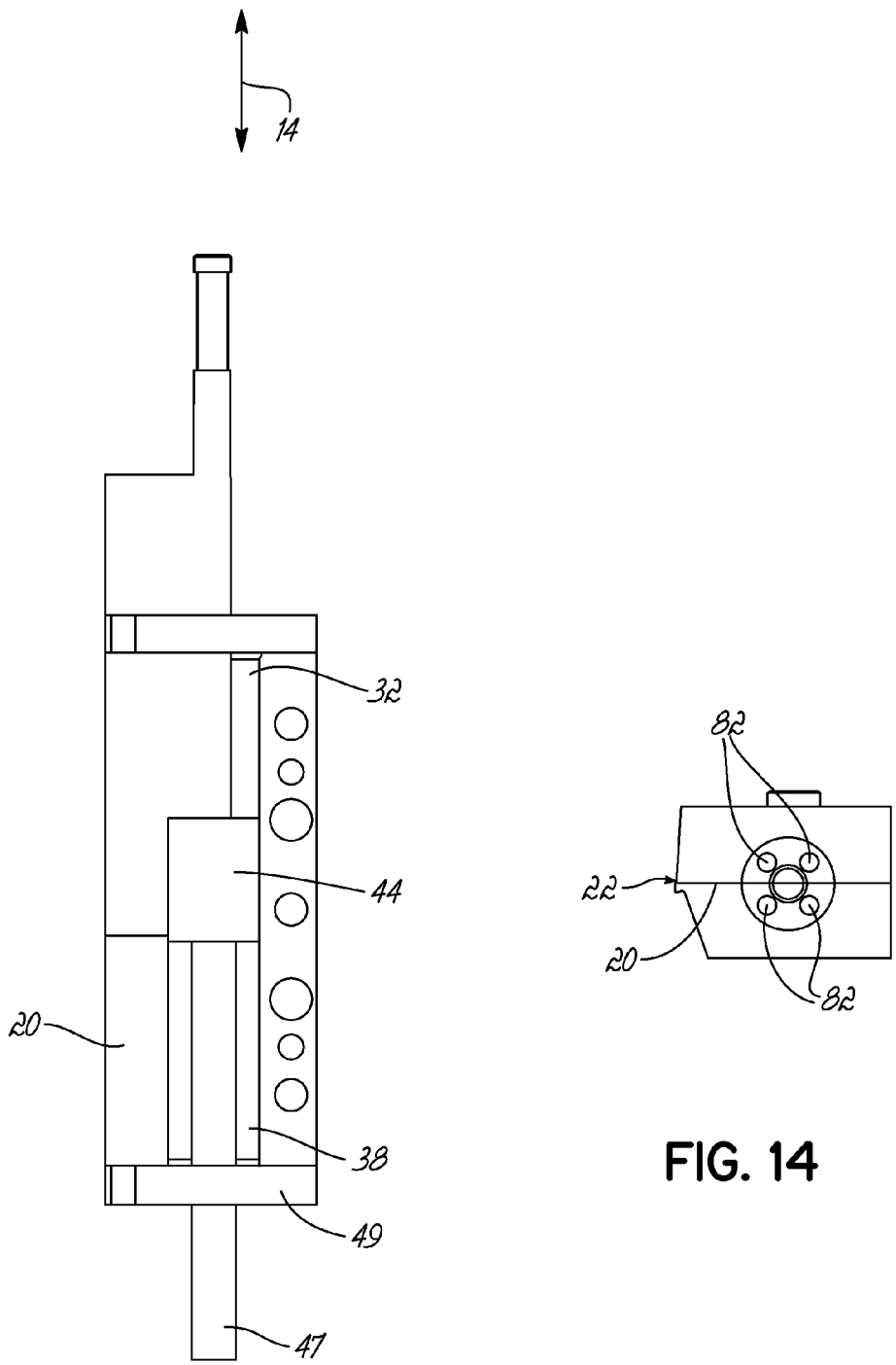
FIG. 13 is a schematic view of an alternative embodiment of a device for dispensing fluid.
FIG. 14 is a side view of a partially sectional depiction of an alternative embodiment of a device for dispensing fluid.

In the exemplary embodiment shown in FIGS. 13 and 14, fluid is supplied through a ring-shaped equalization channel 32 from a supply channel 8 of device 1. An essentially cylindrical piston 44 movably situated and sealed within equalization channel 32, movable in the direction of double arrow 14. A plurality of through channels 82 are preferably formed in piston 44, through which fluid can flow from equalization channel 32 into a distribution channel 38, which is likewise formed as a ring channel and communicates with a slit 20 with a discharge opening 22. A piston rod 47 passes through a section of the basic body with a seal, and serves to support piston 44.

Figure 15:
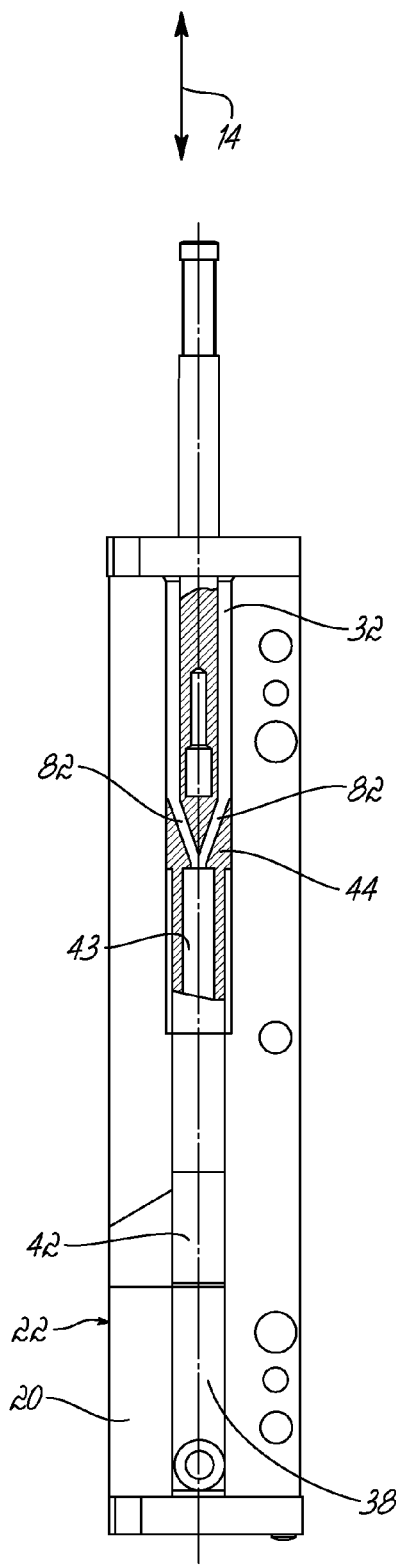
FIG. 15 is a schematic view of an alternative embodiment of a device for dispensing fluid, in another exemplary embodiment, in a schematic view.

Finally, FIG. 15 shows another alternative embodiment. Here, fluid flows from above into a ring-shaped equalization channel 32. An essentially cylindrical piston 44 is situated with a seal within equalization channel 32, movable in the direction of double arrow 14. A plurality of through channels 82 running obliquely in reference to the longitudinal axis of the piston are formed in the piston, through which fluid can flow from discharge channel 32 into an internal cavity 43. The internal cavity is formed in a tube-shaped section. Cavity 43 issues into a transverse distribution channel 38, which is bounded by the tube-shaped section of closure element 42 and issues into slit 20 with discharge opening 22.

What is claimed is:

1. A device for dispensing fluid onto a substrate, comprising:
    a basic body;
    a fluid supply channel in said basic body adapted to communicate with a source of the fluid;
    a nozzle assembly including a distribution channel that communicates with said fluid supply channel;
    a slit including a discharge opening communicating with said distribution channel;
    a closure element mounted for movement along said distribution channel, wherein moving said closure element within said distribution channel defines a variable distribution volume within said distribution channel;
    an equalization channel in said nozzle assembly and communicating with said distribution channel; and
    a displacement element mounted for movement along said equalization channel, wherein moving said displacement element within said equalization channel defines a variable equalization the volume within said equalization channel,
    wherein increasing one of said equalization and distribution volumes simultaneously decreases the other of said distribution and equalization volumes such that said equalization volume and said distribution volume define a constant volume within said nozzle assembly.

2. The device of claim 1, wherein said closure element is a first piston sealed within and mounted for movement along said distribution channel; and
    wherein said displacement element is a second piston sealed within and mounted for movement along said equalization channel.

3. The device of claim 1, further comprising:
    a connecting channel providing a fluid connection between said equalization channel and said distribution channel.

4. The device of claim 1 wherein said equalization channel and said distribution channel are disposed essentially parallel to each other.

5. The device of claim 2, further comprising:
    a connecting channel providing a fluid connection between said equalization channel and said distribution channel.

6. The device of claim 2, wherein said distribution channel and said first piston are each formed with one of an essentially cylindrical shape, a partially cylindrical shape or an essentially polygonal cross-sectional shape; and
    wherein said equalization channel and said second piston are each formed with one of an essentially cylindrical shape, a partially cylindrical shape or an essentially polygonal cross-sectional shape.

7. The device of claim 2, further comprising:
    a motor, wherein at least one of said first piston or said second piston is operatively coupled with said motor.

8. The device of claim 2 wherein said wherein said second piston further comprises:
    an internal cavity and at least one through bore into which fluid can flow from said fluid supply channel into said internal cavity and into said equalization channel.

9. The device of claim 2 wherein said second piston further comprises:
    an internal cavity and a plurality of through channels through which fluid can flow from said fluid supply channel into said internal cavity and into said equalization channel.

10. The device of claim 3, wherein during operation fluid flows from said fluid supply channel into the equalization channel, through said connecting channel into said distribution channel and said slit.

11. The device of claim 5, wherein said nozzle assembly has a fixed nozzle part and a movable nozzle part, said movable nozzle part being movable relative to said fixed nozzle part; and
    wherein moving said movable nozzle part relative to said fixed nozzle part changes the length of said slit.

12. The device of claim 11 wherein at least one of said first piston or said second piston is coupled to said movable nozzle part.

13. The device of claim 11, wherein at least one of said equalization channel, said distribution channel, or said connection channel is formed as at least one depression in at least one of said movable nozzle part or said fixed nozzle part.

14. The device of claim 13, further comprising:
a drive device operative to move said movable nozzle part.

15. The device of claim 14 wherein said drive device is a threaded spindle.

\* \* \* \* \*

UNITED STATES PATENT AND TRADEMARK OFFICE
CERTIFICATE OF CORRECTION

| | | |
|---|---|---|
| PATENT NO. | : 8,800,476 B2 | Page 1 of 1 |
| APPLICATION NO. | : 13/081768 | |
| DATED | : August 12, 2014 | |
| INVENTOR(S) | : Dittman et al. | |

It is certified that error appears in the above-identified patent and that said Letters Patent is hereby corrected as shown below:

In the Specification

Column 1

Line 57, after "a" insert --tab--.

Column 4

Line 48, change "drawing" to --drawings--.

Column 5

Line 62, change "an," to --an--.

Column 7

Line 9, change "that is" to --is that--.

Column 8

Line 31, change "has" to --have--.

Column 9

Line 40, after "44" insert --is--.

In the Claims

Column 10

Claim 1, line 14, delete "the".

Claim 8, line 47, delete the first occurrence of "wherein said".

Signed and Sealed this
Ninth Day of December, 2014

Michelle K. Lee
*Deputy Director of the United States Patent and Trademark Office*